United States Patent
Whitlow et al.

(10) Patent No.: US 10,529,240 B2
(45) Date of Patent: Jan. 7, 2020

(54) SYSTEM AND METHOD FOR INTELLIGENTLY MINING INFORMATION AND BRIEFING AN AIRCREW ON CONDITIONS OUTSIDE THE AIRCRAFT

(71) Applicant: HONEYWELL INTERNATIONAL INC., Morris Plains, NJ (US)

(72) Inventors: Stephen Whitlow, St. Louis Park, MN (US); Dave Pepitone, Polvadera, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 641 days.

(21) Appl. No.: 15/270,508

(22) Filed: Sep. 20, 2016

(65) Prior Publication Data
US 2017/0011635 A1    Jan. 12, 2017

Related U.S. Application Data

(63) Continuation-in-part of application No. 14/208,976, filed on Mar. 13, 2014, now abandoned.

(51) Int. Cl.
*G08G 5/00* (2006.01)
*G01C 23/00* (2006.01)

(52) U.S. Cl.
CPC ........... *G08G 5/0013* (2013.01); *G01C 23/00* (2013.01); *G08G 5/0021* (2013.01); *G08G 5/0052* (2013.01); *G08G 5/0091* (2013.01)

(58) Field of Classification Search
USPC .......................................................... 701/3
See application file for complete search history.

(56) References Cited

U.S. PATENT DOCUMENTS 6,381,538 B1   4/2002   Robinson
6,597,294 B1   7/2003   Ariens
(Continued)

FOREIGN PATENT DOCUMENTS

CN   102915651 A   2/2013
EP      1347412 A1   9/2003
(Continued)

OTHER PUBLICATIONS

EP Decision to Refuse for Application No. 15156564.5 dated Jan. 3, 2019.
(Continued)

*Primary Examiner* — Tyler D Paige
(74) *Attorney, Agent, or Firm* — Lorenz & Kopf, LLP (57) ABSTRACT

A system and method intelligently mines information and briefs an aircrew on conditions outside the aircraft. A mission information manager proactively mines incoming data sources, filters for relevance to current flight, retrieves the most up-to-date information, dynamically selects an appropriate format based on perceptual/cognitive affordances of content, and presents integrated, intuitive data that allows the flight crew to rapidly acquire relevant awareness of conditions outside the aircraft. An expert mission model system reviews incoming information for any situations that are of immediate mission concern. The system presents this information to the flight crew's attention while they have the greatest operational flexibility. Additionally, a human factors module provides decision aiding for select critical phases while taking into account information both outside and inside the aircraft.

8 Claims, 3 Drawing Sheets

(56) References Cited

U.S. PATENT DOCUMENTS

| | | |
|---|---|---|
| 6,604,044 B1 | 8/2003 | Kirk |
| 6,643,580 B1 | 11/2003 | Naimer |
| 7,081,834 B2 | 7/2006 | Ruokangas et al. |
| 7,612,688 B1 | 11/2009 | Vigeant-Langlois et al. |
| 7,630,829 B2 | 12/2009 | Pepitone |
| 8,135,500 B1 | 3/2012 | Robinson |
| 8,195,347 B2 | 6/2012 | Boorman |
| 8,378,853 B2 | 2/2013 | Smith et al. |
| 8,589,994 B2 | 11/2013 | Monroe |
| 9,026,278 B2 | 5/2015 | Dakin |
| 2001/0052562 A1 | 12/2001 | Ishihara |
| 2002/0030610 A1 | 3/2002 | Ishihara |
| 2002/0039072 A1 | 4/2002 | Gremmert |
| 2002/0109612 A1 | 8/2002 | Simon |
| 2003/0132860 A1 | 7/2003 | Feyereisen |
| 2004/0183695 A1 | 9/2004 | Ruokangas |
| 2004/0239550 A1 | 12/2004 | Daly |
| 2007/0182589 A1 | 8/2007 | Tran |
| 2007/0222665 A1* | 9/2007 | Koeneman .......... G01S 13/9303 342/29 |
| 2010/0023264 A1 | 1/2010 | Prashanth |
| 2011/0313597 A1* | 12/2011 | Wilson ................... G01C 23/00 701/3 |
| 2012/0035849 A1 | 2/2012 | Clark et al. |
| 2012/0130624 A1 | 5/2012 | Clark et al. |
| 2012/0218127 A1* | 8/2012 | Kroen ................... G08G 5/0034 340/945 |
| 2012/0245836 A1 | 9/2012 | White |
| 2012/0310450 A1* | 12/2012 | Srivastav ............. G08G 5/0021 701/3 |
| 2013/0046422 A1 | 2/2013 | Cabos |
| 2013/0245860 A1 | 9/2013 | Cooper |
| 2013/0278444 A1 | 10/2013 | Venkataswamy |
| 2014/0129058 A1 | 5/2014 | Elahi |
| 2014/0195077 A1 | 7/2014 | Johnsen |
| 2014/0324351 A1 | 10/2014 | Dannevik |
| 2014/0343765 A1 | 11/2014 | Suiter |
| 2015/0149511 A1* | 5/2015 | Van Den Bergh ..... G06Q 10/10 707/805 |
| 2015/0261829 A1* | 9/2015 | Whitlow ................ G01C 23/00 707/722 |
| 2016/0093217 A1* | 3/2016 | Hale .................... G08G 5/0026 701/120 |

FOREIGN PATENT DOCUMENTS

| | | |
|---|---|---|
| EP | 2048477 A2 | 4/2009 |
| EP | 2290636 A1 | 3/2011 |
| EP | 2325825 A2 | 5/2011 |
| EP | 2434469 A2 | 3/2012 |
| EP | 2434727 A1 | 3/2012 |
| EP | 2574965 A2 | 4/2013 |
| EP | 2919220 A1 | 9/2015 |
| WO | 2008045134 A2 | 4/2008 |

OTHER PUBLICATIONS

EP Examination for Application No. 15 156 564.5-1803 dated Mar. 8, 2017.

Chinese Office Action for Application No. 201510108132.0 dated Aug. 20, 2018.

EP Summons to Oral Proceedings for Application No. 15156564.5 dated Jul. 20, 2018.

Extended EP Search Report for Application No. 171912165-1203 dated Jan. 30, 2018.

AMS-5000 Avionics Management System; Rockwell Collins Company catalog; Copyright 2013.

Ballin M.G., et al.; A Flight Deck Decision Support Tool for Autonomous Airborne Operations; NASA Technical Documents; American Institute of Aeronautics and Astronautics, Published 2002.

EP Extended Search Report for Application No. 15156564.5, dated Jul. 16, 2015.

* cited by examiner

SYSTEM AND METHOD FOR INTELLIGENTLY MINING INFORMATION AND BRIEFING AN AIRCREW ON CONDITIONS OUTSIDE THE AIRCRAFT

CROSS-REFERENCE TO RELATED APPLICATION(S)

This application is a continuation in part based on U.S. patent application Ser. No. 14/208,976 filed Mar. 13, 2014, the entire content of which is incorporated by reference herein.

TECHNICAL FIELD

The exemplary embodiments described herein generally relates to aircraft operations and more particularly to intelligently mining information and briefing an aircrew on conditions outside the aircraft.

BACKGROUND

Worldwide air traffic is projected to double every ten to fourteen years and the International Civil Aviation Organization (ICAO) forecasts world air travel growth of five percent per annum until the year 2020. Such growth may cause degradation in safety and performance and an increase in an already high workload of the flight crew. One of the negative influences on flight safety has been has been the ability of an aircrew to determine which information is important to the current situation from information received from a plurality of sources.

Modern aircraft contain visual display systems that provide pilots and/or flight crews with substantial amounts of important navigation, operational and situational awareness information, including information about the environment and terrain outside the aircraft. Intelligently sifting through such information can significantly improve situational awareness of the flight crew resulting in increased flight safety and performance.

Flight operations are impacted by many conditions outside the aircraft. The trend in aviation modernization is to provide information about these conditions to the flight deck through a variety of methods, transmission sources, databases, and interfaces. The flight crew could simultaneously be receiving information from air traffic control (ATC), aircraft operations center (AOC), airport services, weather services, other flights, and other ground systems. Data sources include digital notice to airmen (D-NOTAMS), digital automatic terminal information service (D-ATIS), aviation routing meteorology weather report (METAR), controller-pilot data link communications (CPDLC) messages, and chart notes. While these disparate information sources can provide critical operational information to the flight deck, the overhead of processing it and transforming the data into the 'BIG PICTURE' is burdensome on the flight crew. First, flight crew members must remember to look for data relevant to the mission or flight, and check for the timeliness or currency for each of these data sources. Then, for each source, they investigate, or search, various flight deck user interfaces to find the information and process it. Flight crews typically search all sources at once due to the available time required for each task, and therefore have to update their operational awareness with separate pieces of the awareness picture across a time frame. For some sources, the content may not be relevant for the current flight, but the flight crew still has to spend valuable time reviewing all messages. Some of these messages could also be updated, making previous messages obsolete. Currently, the flight crew has to spend time reviewing the messages to realize this. These issues are exacerbated since humans are, in general, not adept at integrating information over time and space into an actionable awareness. Furthermore, many of these information sources are integrated into the approach briefing which occurs at a high workload and stress phase of flight.

At these critical phases of flight, the flight crew has less operational flexibility to respond to some situation identified in the digital content. Currently, standard operating procedures are followed dictating when certain information is reviewed. Early notification of an evolving situation would vastly improve the flight crew's ability to handle the situation without resorting to last minute changes that could negatively impact pilot workload, flight safety, fuel costs, and on time performance. Late notification often puts flight crew under time pressure to select a course of action which is very difficult under stress and without up-to-date awareness. If these situations evolve when there are performance issues on the aircraft, the flight crew now also has to evaluate the operational impact before selecting a course of action.

Electronic instrumentation displays continue to advance in sophistication, achieving increasingly higher levels of information density and, consequently, presenting a greater amount of visual information to be perceived and understood by the operator, e.g., the pilot. It is important that visual displays provide a proper cognitive mapping between what the operator is trying to achieve and the information available to accomplish the task.

Accordingly, it is desirable to provide a system and method of compiling information from multiple sources and presenting only important current information to assist the flight crew to evaluate the current situation, leading to improved economy and safety. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for compiling information from multiple sources and presenting only important current information to assist the flight crew to evaluate the current situation.

In an exemplary embodiment, a method for presenting pertinent information to a crewmember of an aircraft, comprises receiving information from a plurality of sources remote from the aircraft; populating a mission information model with the information; determining which of the information is current; determining which of the current information has operational impact; filtering the current information for relevance to a current mission; maintaining a current information structure that contains all current information that is relevant to the current mission; determining within a human factors module the desired format for display based on the current information; and supporting decision making of the pilot for flight critical phases.

In another exemplary embodiment, a system for presenting pertinent information to a crewmember of an aircraft, the system comprises a datalink unit configured to receive data from a plurality of sources; a processor coupled to the datalink unit and configured to: populate a mission information model with the information; determine which of the information is current and has operational impact; determine within a human factors module the desired format for display based on the current information; and provide decisions based on the current information having operational impact to the pilot for flight critical phases.

In yet another exemplary embodiment, a system for presenting pertinent information to a crewmember of an aircraft, the system comprising a datalink unit configured to receive data from a plurality of sources; an avionics system configured to determine conditions outside the aircraft; a navigation system configured to determine a location of the aircraft; a display configured to display information; and a processor coupled to the datalink unit, the avionics system, the navigation system, and the display, and configured to receive information from sources remote from the aircraft; populate a mission information model with the current information; determine which of the information is current; determine which of the information has operational impact; filter the current information for relevance to a current mission; maintain a current information structure that contains all current information that is relevant to the current mission; determine within a human factors module the desired format for display based on the current information; and support decision making of the pilot for flight critical phases.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Alternate embodiments of the present invention to those described below may utilize whatever navigation system signals are available, for example a ground based navigational system, a GPS navigation aid, a flight management system, and an inertial navigation system, to dynamically calibrate and determine a precise course.

In accordance with the exemplary embodiments, a mission information manager (MIM) proactively mines incoming data sources, filters for relevance to various phases of the flight plan, including, for example, the departure airport, flight plan, arrival airport, runways, and taxiways, retrieves the most up-to-date information, dynamically selects an appropriate format (e.g., spatial, verbal, or a combination thereof) based on perceptual/cognitive affordances of content, and presents integrated, intuitive data that allows the flight crew to rapidly acquire relevant awareness of conditions outside the aircraft. To increase the system response to a flight crew request, the system will continually mine the data sources via background processing and update the data content so it can be immediately presented when requested by the flight crew. Furthermore, an expert mission model system (EMMS) reviews incoming information for any situations that are of immediate mission concern. The system presents this information to the flight crew's attention while they have the greatest operational flexibility. Additionally, a human factors module (HFM) provides decision aiding for select critical phases, for example, takeoff and landing, by providing viable options for the flight crew, such as alternate runway selection and optional suitable airport identification while taking into account information both outside and inside the aircraft.

Figure 1:
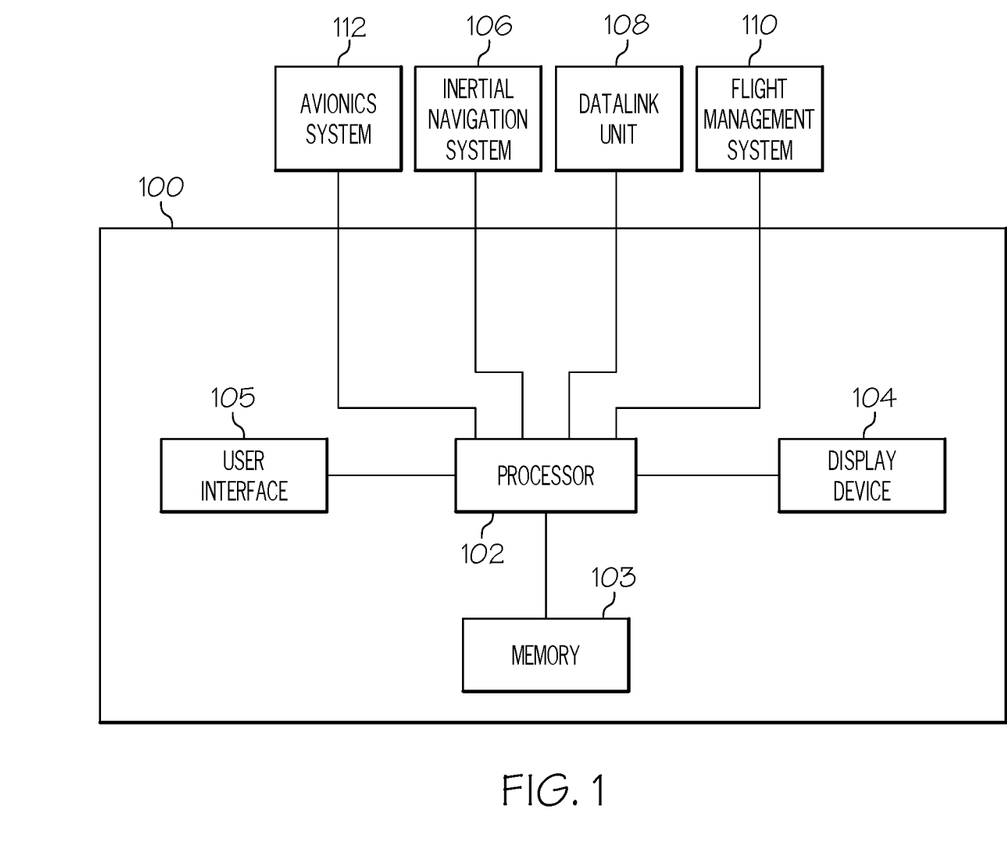
FIG. 1 is a block diagram of a known display system suitable for use in an aircraft in accordance with the exemplary embodiments described herein.

Referring to FIG. 1, an exemplary flight deck display system, system 100, is coupled to an inertial navigation system 106, datalink unit 108, flight management system 110, an avionics system 112, and includes a processor 102, a memory 103, a display device 104, and a user interface 105. The processor 102 is electrically coupled to the display device 104, the inertial navigation system 106, the datalink unit 108, the flight management system 110, the avionics system 112, the memory 103, and the user interface 105.

The processor 102 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The memory 103 may be realized as RAM memory, flash memory, EPROM memory, EEPROM memory, registers, a hard disk, a removable disk, a CD-ROM, or any other form of storage medium known in the art. In this regard, the memory 103 can be coupled to the processor 102 such that the processor 102 can be read information from, and write information to, the memory 103. In the alternative, the memory 103 may be integral to the processor 102. As an example, the processor 102 and the memory 103 may reside in an ASIC. In practice, a functional or logical module/component of the display device 104 might be realized using program code that is maintained in the memory 103. Moreover, the memory 103 can be used to store data utilized to support the operation of the display device 104.

The display device 104 is configured to provide the enhanced images to the operator. In accordance with an exemplary embodiment, the display device 104 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display device 104 may additionally be implemented as a panel mounted display, a HUD (head-up display) projection, or any one of numerous known technologies. It is additionally noted that the display device 104 may be configured as any one of numerous types of aircraft flight deck displays. For example, it may be configured as a multi-function display, a horizontal situation indicator, or a vertical situation indicator. In the depicted embodiment, however, the display device 104 is configured as a primary flight display (PFD).

The datalink unit 108 enables the host aircraft to communicate with external sources, for example, Air Traffic Control (ATC). In this regard, the datalink unit 108 may be used to provide ATC data to the host aircraft and/or to send information from the host aircraft to ATC, preferably in compliance with known standards and specifications. Using the datalink unit 108, the host aircraft can send ITP requests to ground based ATC stations and equipment. In turn, the host aircraft can receive ITP clearance or authorization from ATC (when appropriate) such that the pilot can initiate the requested flight level change.

In operation, the display device 104 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 104 is suitably designed to process data obtained from the sources of flight status data in the manner described in more detail herein. In particular, the display device 104 can use the flight status data of the host aircraft when rendering the ITP display.

The avionics system 112 receives data from outside the aircraft relating to, for example, airspeed, altitude, and angle of attack. The received signals are passed to the processor 102, which uses the received signals to update the current aircraft flight situation. The avionics system 112 may also receive signals from other sources, for example a ground based station.

It should be understood that FIG. 1 is a simplified representation of a system 100 for purposes of explanation and ease of description, and FIG. 1 is not intended to limit the application or scope of the subject matter in any way. In practice, the system 100 and/or aircraft on which it may reside, will include numerous other devices and components for providing additional functions and features, as will be appreciated in the art.

During the course of this description, like numbers may be used to identify like elements according to the different figures that illustrate the various exemplary embodiments.

Figure 2:
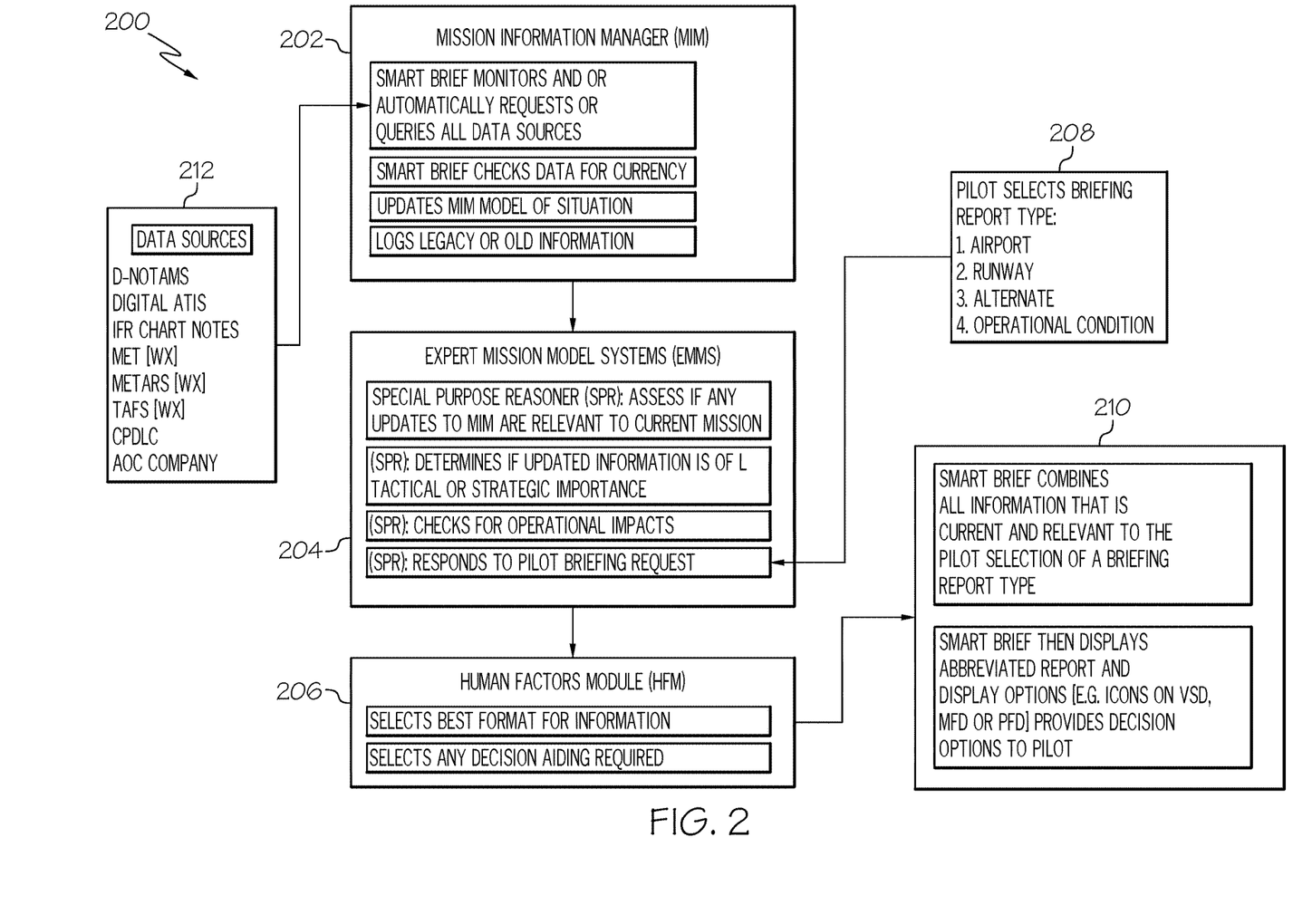
FIG. 2 is a block diagram of software modules of algorithm in accordance with an exemplary embodiment.

Referring to FIG. 2, algorithm 200, implementing one exemplary software module embodiment of the system 100, includes a mission information manager (MIM) 202, expert mission model systems (EMMS) 204, a human factors module (HFM) 206, a selection module 208, and a combiner 210.

The MIM 202 monitors and automatically subscribes to available information sources regarding conditions outside the aircraft from a plurality of data sources 212. Examples of the data sources 212 include distance notice to airmen (D-NOTAMS), digital automatic terminal information service (D-ATIS), weather (MET), aviation routing meteorology weather report (METAR), controller-pilot data link communications (CPDLC) messages, and IFR chart notes, and airline company notifications or messages.

Within the MIM 202, a mission information software model located in memory 103 is initially populated with the most up-to-date information regarding conditions outside and inside the aircraft that have some impact on aircraft operations, referred to as operational impact, be that tactical or strategic. To support operational impact reasoning regarding sub-optimal performance envelopes for icing, engine out, hydraulic failure, and change of flight plans, the mission information software model represents aircraft energy states as well. The MIM 202 determines which of the information received from the data sources 212 is current by comparing a previous message (information) from a data source 212 to a subsequent message (information) from the same data source 212 to determine if the subsequent message supplants or augments the previous message(s). It would then update the mission information software model accordingly, thereby maintaining a current information structure. Outdated information is logged as such.

The EMMS 204 processes the current information in the information structure and assesses, via a special purpose reasoner, the operational impact of the current information and the relevance of the current information to the current mission. Relevant information is information regarding conditions outside the aircraft from available sources. The EMMS 204 also filters the current, relevant, information with operational impact by which is relevant to each phase of flight within the mission. The EMMS 204 determines whether the current information in the information structure is of tactical or strategic importance. If it is tactically important, the system 100 brings it to the flight crew's attention, via rendering symbology on display device 104, to enhance operational flexibility in responding to the situation. In summary, the EMMS 204 maintains the current information structure in memory 103 such that it contains all current information with operational impact that is relevant to the current mission. The system 100 thereby maintains an up-to-date (current) information structure that contains all relevant information regarding conditions outside the aircraft from available data sources 212.

At any time, a pilot may select a briefing report type in the selection module 208. Briefing report types include, for example, pre-flight, takeoff, cruise, approach/go-around, Weather, and notice to airmen (NOTAMs). As such, the briefing report types include information about airports, runways, alternate flight paths, and operational conditions. In response to receiving a pilot selection of a briefing report type, the EMMS 204 cooperates with the Human Factors Module (HFM 206) and the Combiner 210 to assemble all of the information that is current and relevant to the pilot selection of a briefing report type, and provides to the display device 104 an abbreviated report of the information and options available to the pilot.

Most information content has a preferred format for a best representation on the display device 104, for ease of human processing. The preferred format or best representation may be spatial or verbal. For example, restricted airspace information is best represented as a spatial region overlaid on a two dimensional map; whereas, a displaced threshold is best represented conformally on a runway spatial graphic. For spatial information, the best representation could additionally be a function of the zoom level. For example, the conformal representation of the displaced threshold would be invisible at 50 NM zoom, so a spatial map display could be augmented with a textual description of the condition, and may include a zoom command. Accordingly, the HFM 206 comprises a human factors model (a software algorithm that may be stored in memory 103) that assesses the content of each item of information in the current information structure and assigns the item of information an information type. Information types include alphanumeric, spatial, and zoom. The HFM 206 sorts content comprising areas of space or land (such as restricted airspace) into a spatial type, content comprising objects associated with an airport (such as threshold markers) into a symbol type, and content comprising navigational instructions into an alphanumeric type. The HFM 206 further sorts spatial type and symbol type against a respective size threshold to determine whether to apply a zoom command during the display of the information. Based on the information type, the HFM 206 determines a best format for displaying the information content.

The HFM 206 also selects any decision aiding for flight critical phases such as takeoff and landing, when flight crew are under the most time pressure and stress. Special purpose reasoners within the EMMS 204 consider the operational impact of current aircraft performance characteristics along with conditions outside the aircraft such as weather and runway conditions, to identify opportunities to explore an alternate COA. For example, if a condition, such as hydraulic failure, limits the flap deployment is coupled with a recent weather change at the destination airport such as contaminated runway, then the system could intervene. The EMMS 204 would first generate and review viable COAs, before presenting options to pilot. These could include alternate runway selection or diverting to a suitable airport.

All five system functions are done as a background process that are interrupt driven by received new information from data sources 212 (received messages) from any of the subscribed information sources. This minimizes processing requirements while insuring timely notification of tactical situations and an immediate presentation of a dynamically constructed format.

Figure 3:
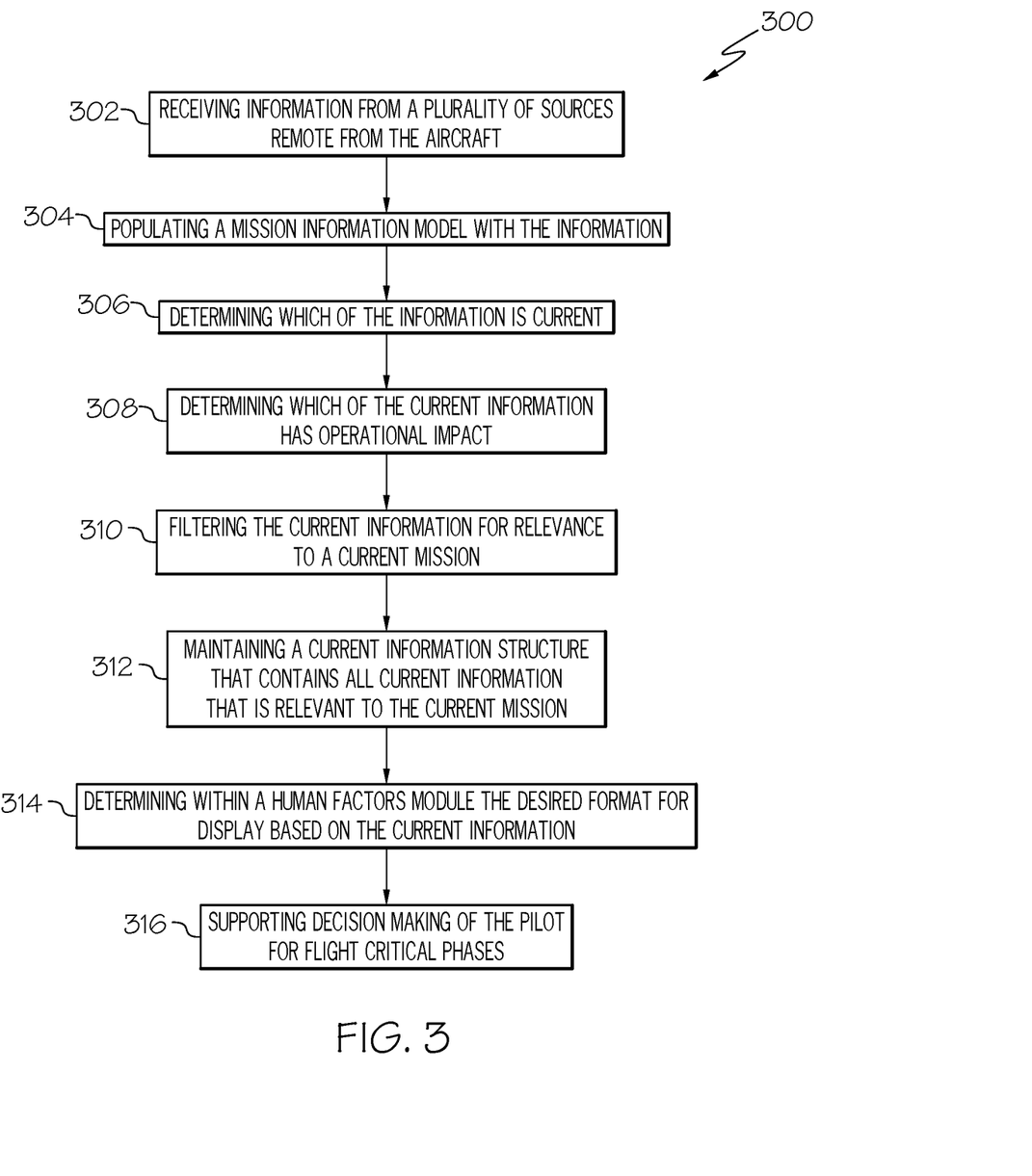
FIG. 3 a flow diagram of an exemplary method suitable for use with the display system of FIG. 1 in accordance with the exemplary embodiments.

FIG. 3 is a flow chart that specifically illustrates an exemplary embodiment of a method 300 suitable for use with a system 100. Method 300 represents one implementation of a method for displaying aircraft approaches or departures on an onboard display of a host aircraft. The various tasks performed in connection with method 300 may be performed by software, hardware, firmware, or any combination thereof. For illustrative purposes, the following description of method 300 may refer to elements mentioned above in connection with preceding FIGS. In practice, portions of method 300 may be performed by different elements of the described system, e.g., a processor, a display element, or a data communication component. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

Referring to FIG. 3, a method for presenting pertinent information to a crewmember of an aircraft, comprises receiving 302 information from a plurality of sources remote from the aircraft; populating 304 a mission information model with the information determining 306 which of the information is current; determining 308 which of the current information has operational impact; filtering 310 the current information for relevance to a current mission; maintaining 312 a current information structure that contains all current information that is relevant to the current mission; determining 314 within a human factors module the desired format for display based on the current information; and supporting 316 decision making of the pilot for flight critical phases.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for presenting information to a crewmember of an aircraft, comprising:
   in a processor onboard the aircraft, executing an algorithm embodied in a software module to perform:
   receiving information about conditions outside the aircraft including weather and runway conditions, from a plurality of sources remote from the aircraft;
   determining which of the information about conditions outside the aircraft is current;
   processing the current information about conditions outside the aircraft with airspeed, altitude, angle of attack, and current aircraft performance characteristics to determine when current information has operational impact;
   filtering the current information by relevance to a phase of flight;
   maintaining a current information structure that contains all current information and the phase of flight that it is relevant to, and logging outdated information;
   sorting items of information in the current information structure comprising areas of space or land into a spatial type, sorting items of information in the current information structure comprising objects associated with an airport into a symbol type, and sorting items of information in the current information structure comprising navigational instructions into an alphanumeric type;
   determining a best format for displaying each of the spatial type, the symbol type, and the alphanumeric type; and
   displaying each item of information in its best format on a display.

2. The method of claim 1 wherein the receiving step comprises:
   receiving information selected from at least one of the group consisting of digital notices to airmen, digital automatic terminal information service, weather, aviation routing meteorology weather report, controller-pilot data link communications messages, and IFR chart notes.

3. The method of claim 1 wherein the operational impact comprises one of tactical or strategic importance.

4. The method of claim 3, further comprising receiving a pilot selected briefing report type, and generating a briefing report responsive thereto.

5. A system for presenting information to a crewmember of an aircraft, the system comprising:
   a memory for storing an algorithm embodied in a software module;
   an on-board processor coupled to the memory and to a plurality of data sources that are external to the aircraft, the processor configured to execute the software module to,
   receive information about conditions outside the aircraft including weather and runway conditions, from the plurality of data sources;

populate a mission information model with received information;

process the received information about conditions outside the aircraft with airspeed, altitude, angle of attack, and current aircraft performance characteristics to determine when current information has operational impact;

filter the current information with operational impact by relevance to a phase of flight;

maintain a current information structure that contains all current information and the phase of flight that it is relevant to, and logging outdated information;

sort items of information in the current information structure comprising areas of space or land into a spatial type, sort items of information in the current information structure comprising objects associated with an airport into a symbol type, and sort items of information in the current information structure comprising navigational instructions into an alphanumeric type;

determine a best format for displaying each of the spatial type, the symbol type, and the alphanumeric type;

display each item of information in its best format on a display system; and present options to the pilot for alternate certificates of authority (COA) when the current information has operational impact to flight critical phases.

6. The system of claim 5, wherein information from the plurality of data sources comprises digital notices to airmen (NOTAM), digital automatic terminal information service, weather data, aviation routing meteorology weather reports, controller-pilot data link communications messages, and IFR chart notes.

7. The system of claim 6, wherein the operational impact comprises one of tactical or strategic.

8. The system of claim 7, wherein the processor is further configured to receive a pilot selected briefing report type, and generate a briefing report responsive thereto.

* * * * *